June 3, 1952

G. W. JOHANSEN ET AL 2,599,058

REVERSIBLE DRIVE MECHANISM

Filed Aug. 2, 1949

Inventors

Gordon W. Johansen
Welford E. Copley

By

ATTORNEYS

June 3, 1952  G. W. JOHANSEN ET AL  2,599,058
REVERSIBLE DRIVE MECHANISM

Filed Aug. 2, 1949  3 Sheets-Sheet 2

Inventors
Gordon W. Johansen
Welford E. Copley

ATTORNEYS

June 3, 1952  G. W. JOHANSEN ET AL  2,599,058
REVERSIBLE DRIVE MECHANISM
Filed Aug. 2, 1949  3 Sheets-Sheet 3

Inventors
Gordon W. Johansen
Welford E. Copley
By
ATTORNEYS

Patented June 3, 1952

2,599,058

UNITED STATES PATENT OFFICE 2,599,058

REVERSIBLE DRIVE MECHANISM

Gordon W. Johansen and Welford E. Copley, Modesto, Calif.; said Copley assignor, by direct and mesne assignments, of one-tenth to Joseph J. Lebeda and four-tenths to Wayne A. Yocom, both of Atwater, Calif.

Application August 2, 1949, Serial No. 108,168

5 Claims. (Cl. 74—665)

This invention is directed to, and it is an object to provide, a reversible drive mechanism of novel construction and operation adapted for use between a prime mover, such as a tractor engine, and opposed driven rotary members, such as the wheels of a tractor.

While the present invention is especially designed as the power transmitting mechanism between the engine and wheels of a small type agricultural tractor, the invention obviously may be effectively adapted to many other uses.

A separate object of the present invention is to provide a reversible drive mechanism which is arranged for simple and easy control to accomplish reversible drive, or the setting to neutral of the opposed driven rotary members, selectively and independently.

Another object of the present invention is to provide a reversible drive mechanism, for the purpose described, which includes reversing clutch units of novel construction; each such clutch unit comprising reversibly driven inner and outer drums, and a rotary shoe assembly between said drums adapted to be frictionally engaged with either thereof, selectively, whereby said shoe assembly is reversibly driven; there being driving connections between each shoe assembly and the corresponding, driven rotary member.

A further object of the present invention is to provide a reversible drive mechanism, as in the preceding paragraph, including novel driving connections between a drive shaft and each of the reversing clutch units.

An additional object of the invention is to provide a reversible drive mechanism which is designed for ease and economy of manufacture; the mechanism being relatively simple in structure, positive in operation, and requiring a minimum of maintenance or repair.

A still further object of the invention is to provide a practical and reliable reversible drive mechanism, and one which will be exceedingly effective for the purpose for which it is designed.

These objects are accomplished by means of such structure and relative arrangement of parts as will fully appear by a perusal of the following specification and claims.

Figure 1:
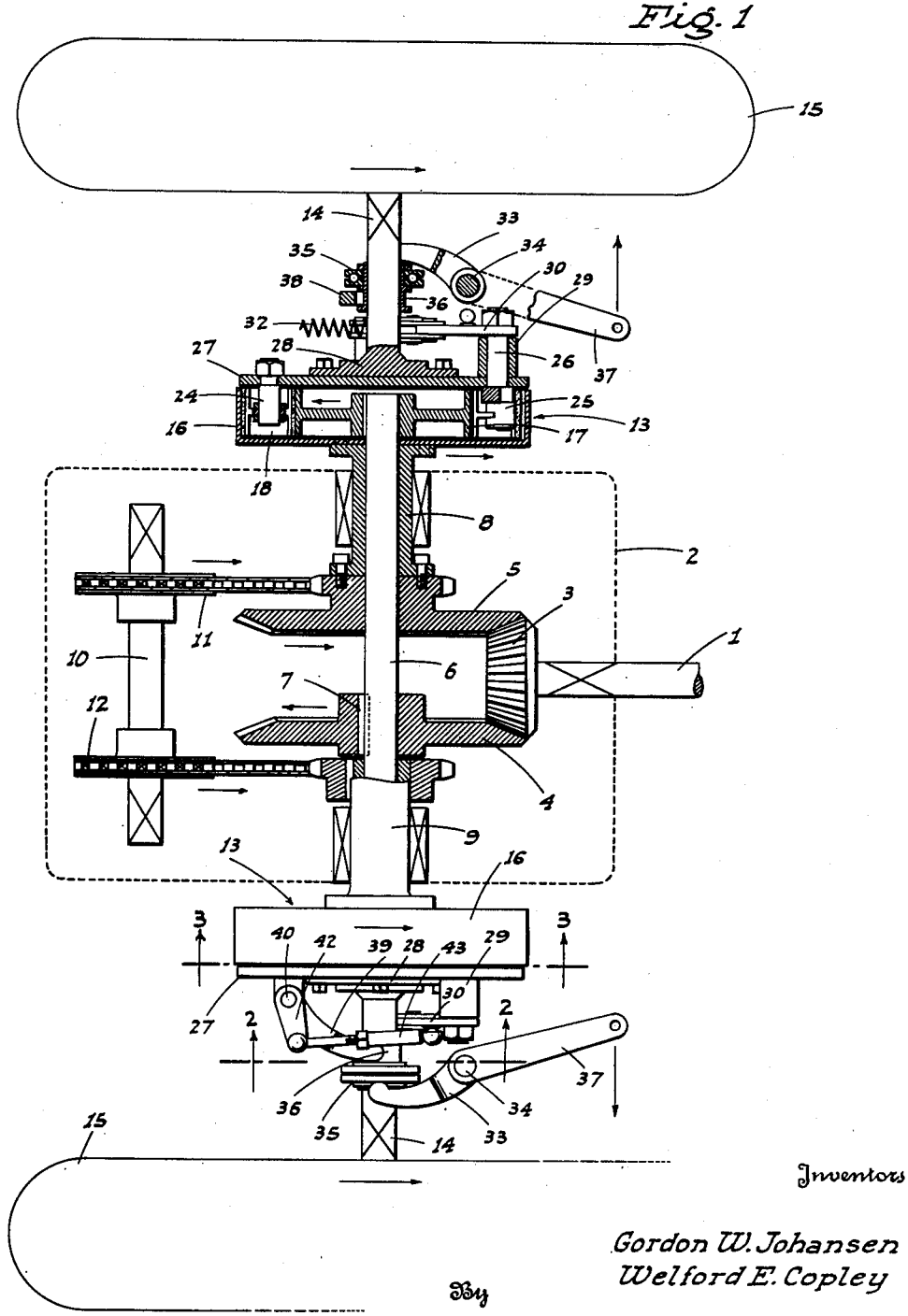
Fig. 1 is a plan view, diagrammatic in part, and sectional in part, of the reversible drive mechanism.
Figure 2:
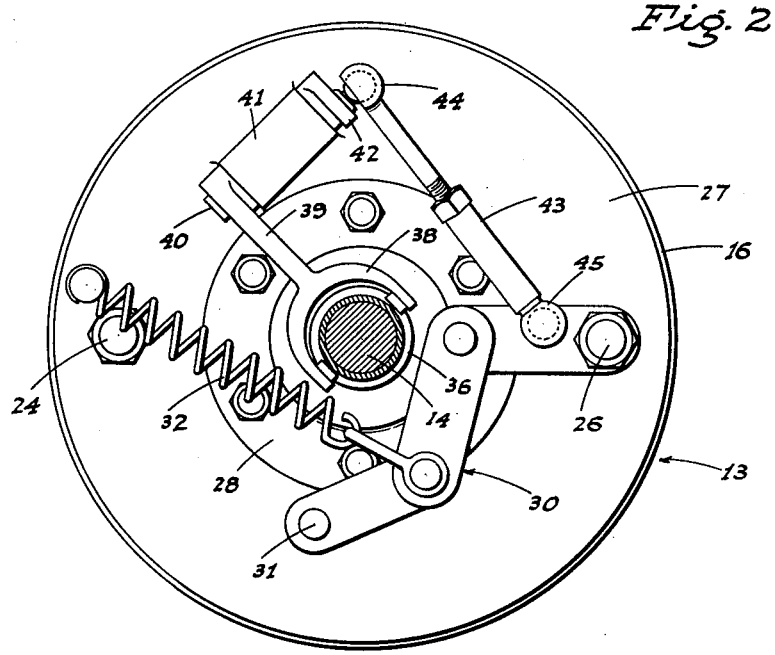
Fig. 2 is an enlarged section on line 2—2 of Fig. 1 showing the external parts of one of the reversing clutch units; such parts being in the positions occupied thereby for forward drive.
Figure 3:
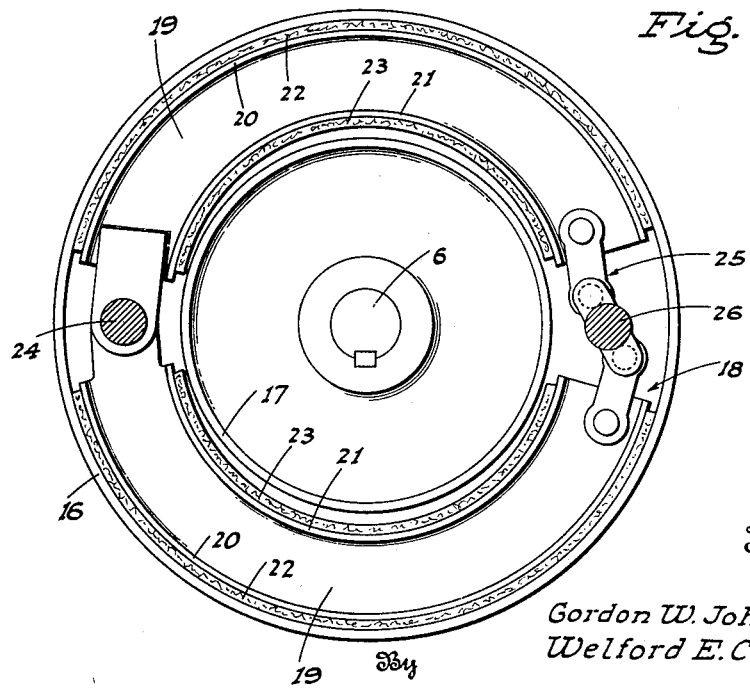
Fig. 3 is an enlarged section on line 3—3 of Fig. 1 showing the internal parts of said one reversing clutch unit; such parts being in the positions occupied thereby for forward drive.
Figure 4:
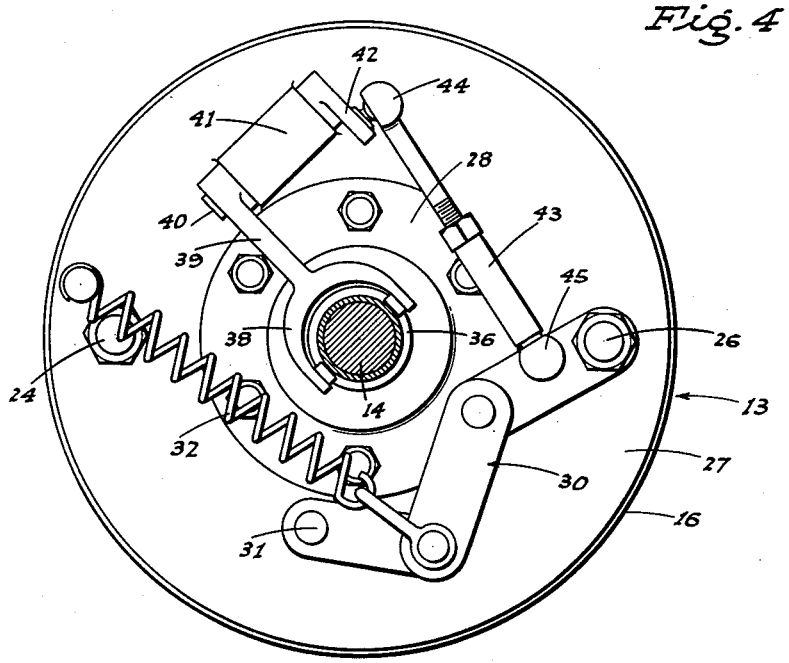
Fig. 4 is a view similar to Fig. 2, but shows the parts in the positions occupied thereby for reverse drive.
Figure 5:
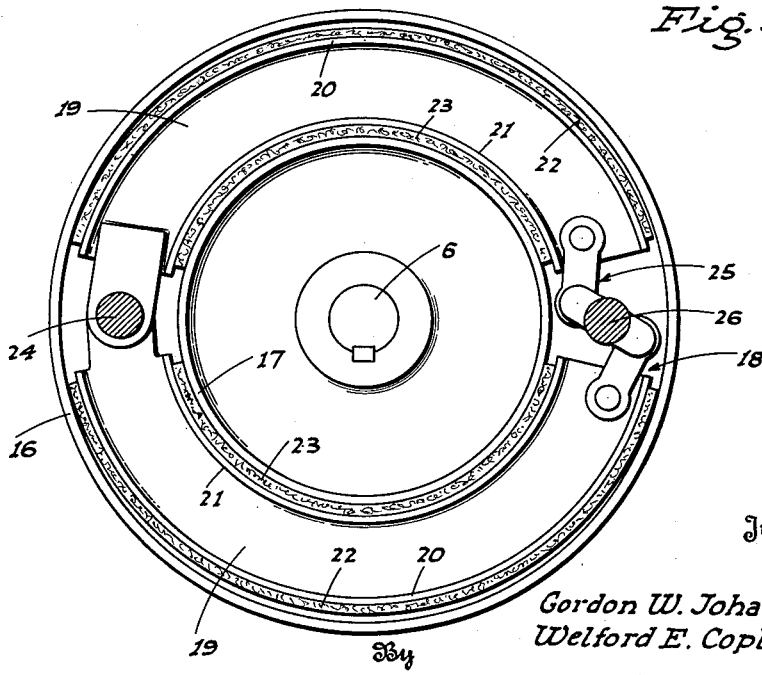
Fig. 5 is a similar view to Fig. 3, but shows the parts in the positions occupied thereby for reverse drive.

Referring now more particularly to the characters of reference on the drawings, the reversible drive mechanism comprises an input or drive shaft 1 actuated from the engine (not shown); such drive shaft 1 projecting into a case 2.

Within the case 2 the drive shaft 1 is fitted with a bevel pinion 3 which runs in mesh between opposed bevel gears, indicated at 4 and 5, which surround a cross shaft 6 journaled in said case and projecting to end terminations beyond opposite sides of said case.

The bevel gear 4 is keyed, as at 7, to the cross shaft 6, whereas the bevel gear 5 is freely turnable on said cross shaft.

Axially outwardly of the bevel gears 4 and 5 the cross shaft 6 is surrounded, in freely turnable relation, by drive sleeves 8 and 9. The drive sleeve 8 is connected in direct driven relation to the bevel gear 5 whereby said drive sleeve 8 is rotated in the same direction as the bevel gear 5, and as shown by the arrow in Fig. 1.

The drive sleeve 9 is rotated in the same direction as the drive sleeve 8 as follows:

A transfer shaft 10 is journaled in the case 2 in spaced relation from but parallel to the cross shaft 6; such transfer shaft 10 being driven by an endless chain and sprocket unit 11 from the bevel gear 5.

Another endless chain and sprocket unit 12 connects between the transfer shaft 10 and the drive sleeve 9, with the result that the latter is rotated from the bevel gear 5 in the same direction.

The drive sleeves 8 and 9 project out of the corresponding sides of the case 2, but terminate short of the corresponding ends of the cross shaft 6.

With the driving mechanism above described, the drive sleeves 8 and 9 rotate in one direction, while the cross shaft 6 simultaneously rotates in an opposite direction.

Laterally out from each side of the case 2, the mechanism includes a reversing clutch unit, indicated generally at 13, connected in actuating relation to a shaft or axle 14 mounted in axially alined but spaced relation to the corresponding end of the cross shaft 6.

When the mechanism is embodied in a vehicle, such as a small agricultural tractor, each shaft 14 is the axle which carries one of the wheels 15 of said vehicle.

As each of the reversing clutch units 13 is identical, except for being left and right hand, a description of one will suffice for both.

Each reversing clutch unit 13 comprises an outer clutch drum 16 and an inner clutch drum 17 of differential diameters; such clutch drums 16 and 17 being mounted in concentric relation whereby a substantial spacing exists between the peripheries thereof. The outer clutch drum 16 is fixed to the adjacent end of the corresponding drive sleeve 8 or 9, while the inner clutch drum 17 is keyed to the adjacent end of the cross shaft 6. Consequently, the drums 16 and 17 are constantly driven, but in reverse or opposed directions.

A rotary clutch shoe assembly, indicated generally at 18, is disposed between the outer clutch drum 16 and inner clutch drum 17; such assembly comprising a pair of substantially half-circle clutch shoes 19 which are double faced; i. e. including an outer face 20 and an inner face 21 fitted with friction lining 22 and 23, respectively.

At one end the clutch shoes 19 are connected to an anchor pin 24, and at the opposite end said shoes are connected by actuating linkage 25 which includes a rotary control pin 26 whose rotation in one direction or the other is adapted to cause expansion or contraction, respectively, of the rotary shoe assembly 18.

The anchor pin 24 and the rotary control pin 26 are also driving pins, and project through a driving disc 27 disposed in axially alined, adjacent facing relation to the outer end of the drums 16 and 17.

The shaft or axle 14 includes an inner end hub 28 affixed centrally to the driving disc 27, whereby when the rotary clutch shoe assembly 18 rotates, such motion is imparted directly to the axle 14 and wheel 15.

The rotary clutch shoe assembly 18 is controlled as follows:

The rotary control pin 26 is elongated and projects through a bearing 29 on the driving disc 27. At its outer end the rotary control pin 26 is connected to one end of exterior control linkage 30 whose other end is pivoted to the driving disc 27, as at 31.

A tension spring 32, connected between the driving disc 27 and the control linkage 30, normally acts on said linkage to rotate the control pin 26 in a direction which causes expansion of the rotary clutch shoe assembly 18 into friction gripping relation with the outer clutch drum 16 whereby said shoe assembly rotates with such drum.

When the shoe assembly grips and is rotating with the outer drum, the drive is preferably forward, while reverse drive results from the shoe assembly gripping and rotating with the inner drum.

To shift the control linkage 30 to an intermediate or neutral position between the drums 16 and 17, or to contract said shoe assembly into gripping relation with the inner clutch drum 17 to rotate with the latter, the following arrangement is provided:

A shifting fork 33, mounted on a fixed pivot 34, works through a thrust bearing 35 to actuate a shifting sleeve 36 on the shaft or axle 14; the shifting fork 33 including a control lever 37.

The shifting sleeve 36 cooperates with a fork 38 adapted to be shifted back and forth by the sleeve 36; said fork 38 including a fork arm 39 fixed on one end of a stub shaft 40 which projects through a bearing 41 externally on the driving disc 27. At the end opposite the fork arm 39 the stub shaft 40 is fitted with a lever arm 42, and an adjustable control rod 43 is connected by ball and socket units 44 and 45 between the lever arm 42 and control linkage 30.

With the above arrangement the linkage 30 is positively and effectively controlled from the lever 37 so that the rotary clutch shoe assembly 18 may be allowed to expand to grip the outer clutch drum 16, contracted to grip the inner clutch drum 17, or set in a neutral position in non-gripping relation to both of said drums.

Thus, by predetermined movement of the control levers 37 a positive and effective drive, forward or reverse, may be imparted to the axles 14 and wheels 15 through the clutch units 13, or said units may be set in neutral.

For forward or reverse driving, or neutral setting of the clutch units 13, the control levers 37 are actuated simultaneously by suitable operator controlled connections (not shown).

In addition, by actuating the control levers 37 selectively and independently, the clutch units 13 may be employed to steer the vehicle; this being accomplished by differential drive to the wheels 15.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention as defined by the appended claims.

Having thus described the invention, the following is claimed as new and useful, and upon which Letters Patent are desired:

1. A reversible drive mechanism comprising a pair of spaced, axially alined reversing clutch units each of which includes an inner and an outer drum in spaced concentric relation, a cross shaft extending between the clutch units connected in driving relation to the inner drums, sleeves turnable on the cross shaft adjacent and connected in driving relation to the outer drums, means operative to simultaneously drive the sleeves and shaft with the latter rotating in a direction opposite to the direction of rotation of the sleeves, a rotary shoe assembly disposed between the drums of each clutch unit to expand or contract whereby to grip and rotate with the outer drum or inner drum, respectively, of said unit, a separate shaft projecting axially outward from adjacent each clutch unit, means connecting the shoe assemblies in driving relation to corresponding ones of the separate shafts, and means operative to cause expansion or contraction, selectively, of said shoe assemblies.

2. A reversible drive mechanism comprising a pair of spaced, axially alined reversing clutch units each of which includes an inner and an outer drum in spaced concentric relation, a cross shaft extending between the clutch units connected in driving relation to the inner drums, sleeves turnable on the cross shaft adjacent and connected in driving relation to the outer drums, means operative to simultaneously drive the sleeves and shaft with the latter rotating in a direction opposite to the direction of rotation of the sleeves, a rotary shoe assembly disposed between the drums of each clutch unit to expand or contract whereby to grip and rotate with the outer drum or inner drum, respectively, of said unit, a separate shaft projecting axially outward from adjacent each clutch unit, means connecting the shoe assemblies in driving relation to corresponding ones of the separate shafts, and means operative to cause expansion or contraction, selectively, of said shoe assemblies; said drive means comprising a pair of gears on the cross shaft between the sleeves, one gear being fixed to the cross shaft and the other being turnable thereon, a drive pinion in mesh between said gears, said other gear being fixed to the adjacent sleeve, and connections between said other gear and the opposite sleeve operative to rotate the latter in the same direction as said adjacent sleeve.

3. A reversible drive mechanism comprising a pair of spaced, axially alined reversing clutch units each of which includes an inner and an outer drum in spaced concentric relation, a cross shaft extending between the clutch units connected in driving relation to the inner drums, sleeves turnable on the cross shaft adjacent and connected in driving relation to the outer drums, means operative to simultaneously drive the sleeves and shaft with the latter rotating in a direction opposite to the direction of rotation of the sleeves, a rotary shoe assembly disposed between the drums of each clutch unit to expand or contract whereby to grip and rotate with the outer drum or inner drum, respectively, of said unit, a separate shaft projecting axially outward from adjacent each clutch unit, means connecting the shoe assemblies in driving relation to corresponding ones of the separate shafts, and means operative to cause expansion or contraction, selectively, of said shoe assemblies; said drive means comprising a pair of gears on the cross shaft between the sleeves, one gear being fixed to the cross shaft and the other being turnable thereon, a drive pinion in mesh between said gears, said other gear being fixed to the adjacent sleeve, a transfer shaft parallel to the cross shaft, and driving connections between said sleeves and the transfer shaft arranged to cause simultaneous rotation of said sleeves in the same direction.

4. A reversible drive mechanism, as in claim 3, in which said driving connections are endless chain and sprocket units.

5. A reversible drive mechanism comprising a pair of spaced, axially alined reversing clutch units each of which includes a pair of spaced rotary clutch members, a cross shaft extending between the clutch units connecting in driving relation with one of the said rotary clutch members, sleeves turnable on the cross shaft connected in driving relation with the other of the rotary clutch members of said clutch units, means operative to simultaneously drive the cross shaft and sleeves in opposite rotary directions, a third rotary clutch member mounted intermediate each pair of rotary clutch members for movement into driven engagement with either thereof, a separate shaft projecting axially outward from adjacent each clutch unit, means coupling the third rotary clutch member of each clutch unit in driving connection with the corresponding separate shaft, and means operative to move the third rotary clutch member of each unit into engagement with either one of the corresponding pair of rotary clutch members, selectively; said drive means comprising a pair of gears on the cross shaft between the sleeves, one gear being fixed to the cross shaft and the other being turnable thereon, a drive pinion in mesh between said gears, said other gear being fixed to the adjacent sleeve, a transfer shaft parallel to the cross shaft, and driving connections between said sleeves and the transfer shaft arranged to cause simultaneous rotation of said sleeves in the same direction.

GORDON W. JOHANSEN.
WELFORD E. COPLEY.

REFERENCES CITED

The following references are of record in the file of this patent:

UNITED STATES PATENTS

| Number | Name | Date |
|---|---|---|
| 443,259 | Pedersen | Dec. 23, 1890 |
| 687,474 | Broberg | Nov. 26, 1901 |
| 751,022 | Sonander | Feb. 2, 1904 |
| 856,763 | Brooks | June 11, 1907 |
| 1,341,162 | Armistead | May 5, 1920 |
| 1,358,997 | Springer | Nov. 16, 1920 |
| 1,751,645 | Nieman | Mar. 25, 1930 |
| 2,187,967 | Fawick | Jan. 23, 1940 |
| 2,228,622 | Emrick | Jan. 14, 1941 |
| 2,385,734 | Silva | Sept. 25, 1945 |

FOREIGN PATENTS

| Number | Country | Date |
|---|---|---|
| 581,534 | Great Britain | Oct. 16, 1946 |